United States Patent

Takahashi et al.

[11] Patent Number: 5,713,771
[45] Date of Patent: Feb. 3, 1998

[54] OUTBOARD MOTOR COWLING ARRANGEMENT

[75] Inventors: Masanori Takahashi; Hitoshi Watanabe, both of Hamamatsu, Japan

[73] Assignee: Sanshin Kogyo Kabushiki Kaisha, Shizuoka-ken, Japan

[21] Appl. No.: 777,388

[22] Filed: Dec. 27, 1996

[30] Foreign Application Priority Data

Dec. 30, 1995 [JP] Japan .................................. 7-354174

[51] Int. Cl.$^6$ .................................................. B63H 21/26
[52] U.S. Cl. .................................. 440/77; 123/184.34
[58] Field of Search .................................. 123/572, 184.34, 123/184.35, 195 P; 440/77, 88, 89, 900

[56] References Cited

U.S. PATENT DOCUMENTS

| | | |
|---|---|---|
| 4,967,704 | 11/1990 | Imaeda . |
| 5,340,343 | 8/1994 | Kawamukai et al. ............... 440/77 |
| 5,370,563 | 12/1994 | Yamazaki et al. ............... 440/77 |
| 5,445,547 | 8/1995 | Furukawa . |
| 5,488,939 | 2/1996 | Nakai et al. . |
| 5,489,227 | 2/1996 | Ishida et al. ............... 440/77 |
| 5,513,606 | 5/1996 | Shibata . |

*Primary Examiner*—Stephen Avila
*Attorney, Agent, or Firm*—Knobbe, Martens, Olson & Bear, LLP

[57] ABSTRACT

An air intake system for an engine powering an outboard motor is disclosed. The engine is positioned within a cowling of the motor, the cowling including an air intake vent. The engine is vertically positioned, having a camshaft drive at an upper end thereof, the camshaft drive enclosed by a drive cover. An air passage is defined between the drive cover and cowling and leads from the vent to an engine air intake. The air intake comprises a passage formed by the cover and extending therethrough. The passage through the cover leads to a throttle body having a throttle plate therein, the throttle body connected to a surge tank from which runners extends to provide air to the combustion chambers. Air flows through the passage in the cover through a flexible hose member extending between the cover and the throttle body.

15 Claims, 12 Drawing Sheets

OUTBOARD MOTOR COWLING ARRANGEMENT

FIELD OF THE INVENTION

The present invention relates to an air intake for an engine of an outboard motor, and more particularly, to such an intake which cooperates with a cowling of the motor and a camshaft drive cover of the engine.

BACKGROUND OF THE INVENTION

As is well known, outboard motors for use in powering watercraft include an engine powering a water propulsion apparatus such as a propeller. These outboard motors have a cowling in which is positioned the engine. In order to keep the outboard motor small in dimension, the engine must have a very compact arrangement.

One problem associated with these engines is their air intake systems. Often, the air intake comprises an elongate plenum which terminates at an air box with a filter therein. This plenum and air box are positioned alongside the engine so as not to protrude therefrom and increase the size of the engine.

A problem exists, however, that positioning of the air inlet in a manner simply to maintain the engine's small size may result in the air intake being positioned in a location where the air flow through the cowling thereto is reduced. In addition, the air which does reach the intake may be heated along the course of its path about the engine to the air intake, reducing the efficiency of the engine.

A compact and efficient air intake system for an engine of an outboard motor is desired.

SUMMARY OF THE INVENTION

In accordance with the present invention, there is provided an engine which is positioned within a cowling. The engine has a block with a cylinder head connected thereto, the block and cylinder head defining at least one combustion chamber. A member is movably positioned in each combustion chamber for driving a crankshaft. An intake passage extends through the cylinder head to the combustion chamber, and an exhaust passage extends through the cylinder head from the combustion chamber. At least one camshaft is provided for actuating means for opening and closing the intake and exhaust passages. A camshaft drive is provided at one end of the engine, by which the crankshaft drives the camshaft.

A camshaft drive cover is positioned at the end of the engine and generally encloses the camshaft drive thereunder. The drive cover and cowling define therebetween an air passage leading from an air vent in the cowling through the cowling along the engine. An engine air intake is provided for routing the air from this passage through to the intake passage leading to the combustion chamber. This intake comprises an opening in the drive cover and a passage leading therethrough to a flexible tube, the tube in turn leading to a throttle body and on to a runner extending to the intake passage.

The engine air intake of the present invention has the advantage that incoming air is routed through the cowling away from the engine, so that the heat transfer from the engine to the air is minimized. In addition, formation of a passage in the camshaft drive cover eliminates the need for a separate air intake plenum extending from the throttle body. Lastly, the flexible tube extending between the cover and throttle body allows for easy assembly of the engine and serves to reduce the transmission of engine vibration between these components.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

In accordance with the present invention, there is provided an outboard motor 20 having an engine 22 arranged in accordance with the present invention.

Figure 1:
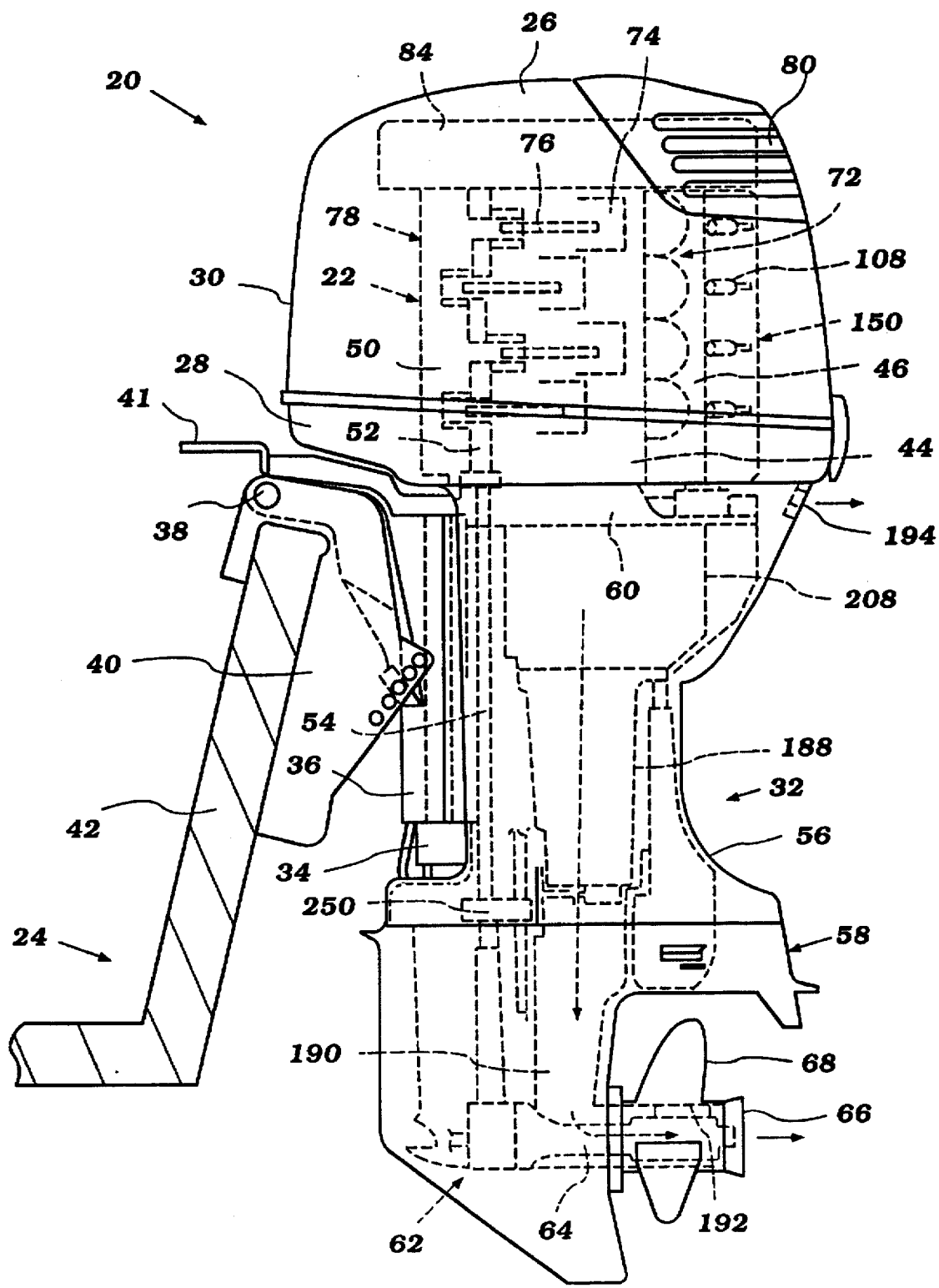
FIG. 1 is a side view of an outboard motor having an engine arranged in accordance with the present invention, with the engine and other components internal to the motor illustrated in phantom.

As best illustrated in FIG. 1, the outboard motor 20 is utilized to power a watercraft 24. The outboard motor 20 has a powerhead area 26 comprised of a lower tray portion 28 and a main cowling portion 30. The motor 20 includes a lower unit 32 extending downwardly therefrom. A steering shaft, not shown, is affixed to the lower unit 32 by means of a lower bracket 34. The steering shaft is supported for steering movement about a vertically extending axis within a swivel bracket 36. The swivel bracket 36 is connected by means of a pivot pin 38 to a clamping bracket 40 which is attached to the watercraft transom 42. The pivot pin 38 permits the outboard motor 20 to be trimmed and tilted up about the horizontally disposed axis formed by the pivot pin 38.

The power head 26 of the outboard motor 20 includes the engine 22 which is positioned within the cowling portion 30. The engine 20 is preferably of the inline, four-cylinder variety, and thus includes a cylinder block 44 which has a cylinder bank closed by a cylinder head assembly 46 in a manner which will be described. As also illustrated in FIG. 1, the engine 22 is oriented within the cowling 30 such that its cylinder head 46 is positioned on the cylinder block 44 on the side opposite the watercraft's transom 42.

A crankcase member 50 is affixed to the end of the cylinder block 44 opposite the cylinder head 46. A crankshaft 52 is rotatably journalled in a crankcase chamber formed by the cylinder block 44 and the crankcase member 50. As is typical with outboard motor practice, the engine 22 is mounted in the power head 26 so that the crankshaft 52 rotates about a vertically extending axis. This facilitates coupling to a drive shaft 54 in a manner which will be described.

The lower unit 32 has an upper or "drive shaft housing" section 56 and a lower section 58 depending therebelow, and the drive shaft 54 extends through both sections. An exhaust guide assembly 60 is positioned directly below the engine 22 within the lower unit 32.

The drive shaft 54 depends into the lower unit 32, wherein it drives a conventional bevel gear, forward neutral reverse transmission, indicated generally by the reference numeral 62 and shown only schematically. The transmission 62 is shown in a schematic fashion because its construction per se forms no part of the invention. Therefore, any known type of transmission may be employed.

The transmission 62 drives a propeller shaft 64 which is journalled within the lower unit 32 in a known manner. A hub 66 of a propeller, indicated generally by the reference numeral 68, is coupled to the propeller shaft 64 for providing a propulsive force to the watercraft 24 in a manner well known in this art.

The construction of the engine 20 and its arrangement within the cowling 30 will now be described in more detail, referring first primarily to FIGS. 1, 5 and 7. As illustrated therein, the cylinder block 44 and cylinder head 46 defined therein a number of variable volume combustion chambers 72, preferably totalling four in number, and arranged in a vertical, inline fashion. It is understood that the engine 22 may include as few as one combustion chamber or more than four.

Each combustion chamber 72 has a piston 74 which is connected to the crankshaft 52 via a connecting rod 76. The cylinder head 46 is preferably connected to the cylinder block 44 via a number of bolt 48, illustrated in FIG. 5.

Figure 2:
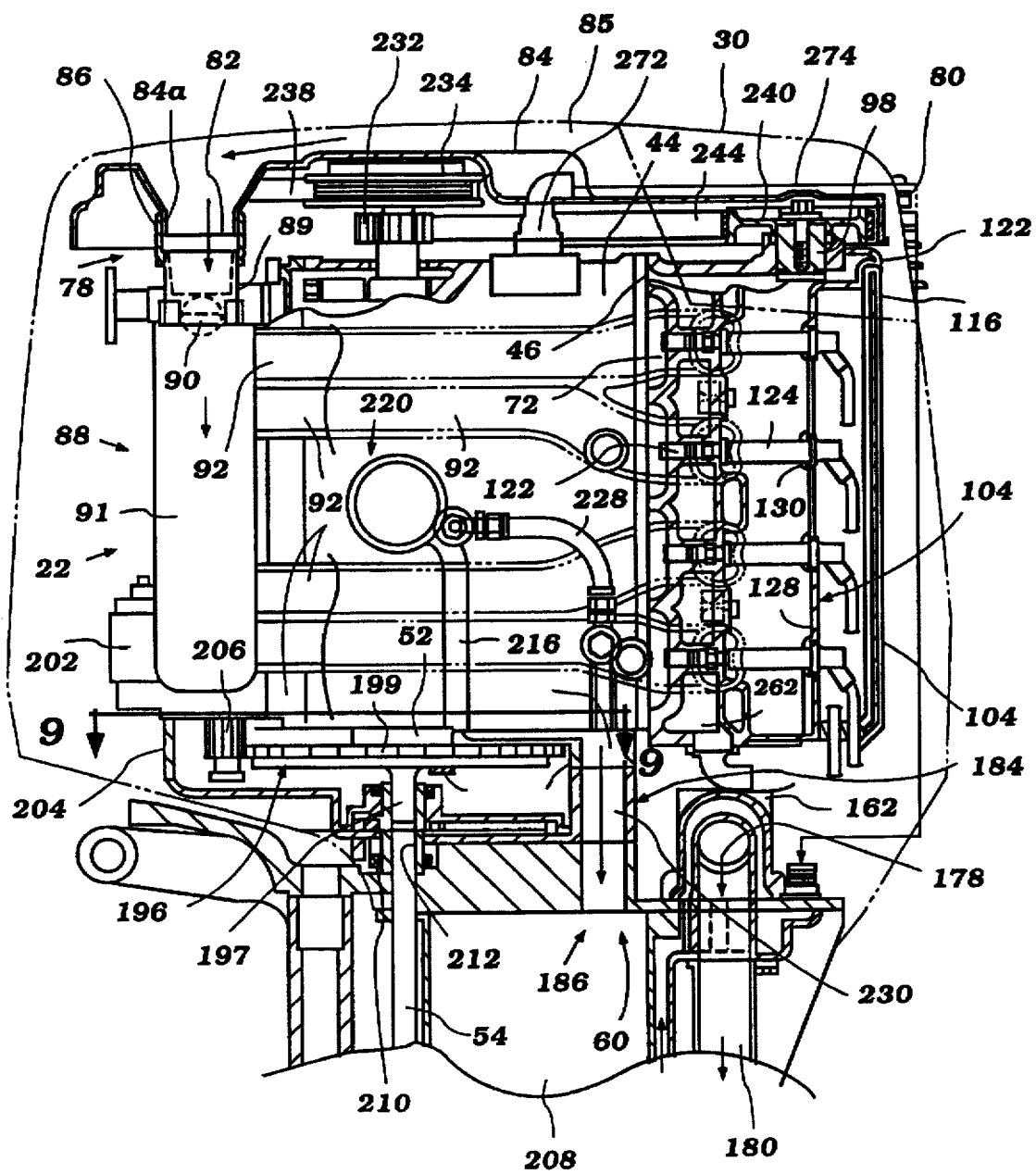
FIG. 2 is a side view of the engine illustrated in FIG. 1, with certain portions thereof illustrated in cross-section.

As best illustrated in FIG. 2, an intake system 78 provides air to each combustion chamber 72. The intake system 78 includes air vents 80 positioned in the cowling 30 of the motor 20. As best illustrated in FIG. 2, air drawn through these vents 80 passes into an air passage 85 formed between the cowling 30 and a camshaft drive cover 84 positioned on the top of the engine 22.

The air passes to an inlet 82. The inlet 82 is formed by the intersection of a connecting portion 84a of the camshaft drive cover 84 and a section of flexible tubing 86 (such as a section of robber hose) which extends to a throttle body 89. The connecting portion 84a of the cover 84 preferably comprises a tube-like passage formed through the cover.

The throttle body 89 extends in communication with a surge tank portion 91 of an intake manifold 88. A throttle plate 90 is positioned within that portion of the inlet 82 defined by the throttle body 89 for use in regulating the rate of air flow into the engine 22 with throttle rod 93 (which is connected to a user-operated throttle linkage, not shown), as is well known in the art.

The above-described arrangement has several advantages. First, the incoming air is routed to the air intake of the engine 22 along a path which prevents it from being substantially heated by the engine 22. This has the advantage that the incoming air remains cool, improving the efficiency of the engine. In addition, since the camshaft drive cover 84 includes an air directing connecting portion 84a, the need for a long air inlet pipe extending from the throttle body to the air vents is eliminated, thus saving on manufacturing costs and assembly. Also, because the connecting portion 84a of the cover 84 is connected to the throttle body 89 with the flexible tubing 86, any alignment errors between the two can easily be accommodated. Moreover, engine vibration can be absorbed, or at least is prevented from being transmitted, throughout the flexible tubing 86 between the cover 84 and throttle body 89. Another advantage is that the air inlet 82 and throttle body 89 are positioned at the top of the engine 22, reducing the possibility of water entering the system and fouling the engine 22.

Four runners 92 extend from the surge tank 91, the total number of runners equalling the number of combustion chambers 72. As best illustrated in FIG. 7, these runners 92 extend to intake passages 94 extending through the cylinder head 46 to the combustion chambers 72. In the present arrangement, the air inlet 82 and surge tank 91 are preferably positioned on the side of the cylinder block 44 opposite the cylinder head 46, with the runners 92 extending around the engine to their connection with the cylinder head (See FIG. 3). Further, the runners 92 are joined to one another in pairs, thereby facilitating their easy assembly to the engine 22. In addition, the pairs of runners are separated in the vertical direction, allowing simple access to other engine features, such as an oil filter 220, described in more detail below.

Figure 7:
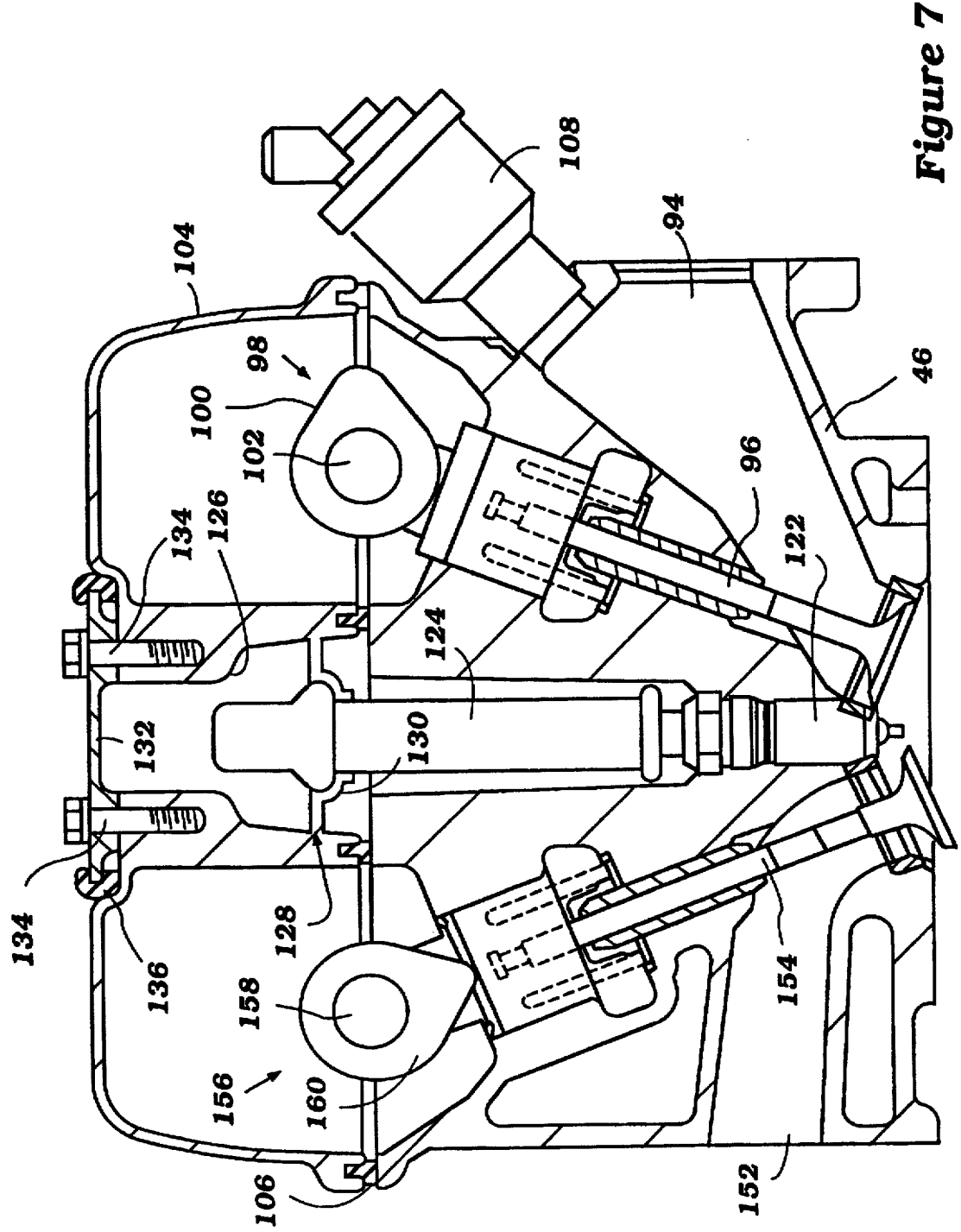
FIG. 7 is a partial cross-sectional view of the engine illustrated in FIG. 6 and taken along line 7—7 therein.

As illustrated in FIG. 7, means are provided for selectively allowing air to be introduced into each combustion chamber 72. Preferably, this means comprises an intake valve 96 positioned in each intake passage 94. The intake valves 96 are preferably opened and closed with an intake camshaft 98. The intake camshaft 98 comprises a number of actuating lobes 100 positioned on a rotating shaft 102. The manner by which the intake camshaft 98 is rotated is described in more detail below. The intake camshaft 98 is preferably enclosed by a camshaft cover 104 which is connected to the cylinder head 46 with one or more seals 106 therebetween.

Figure 3:
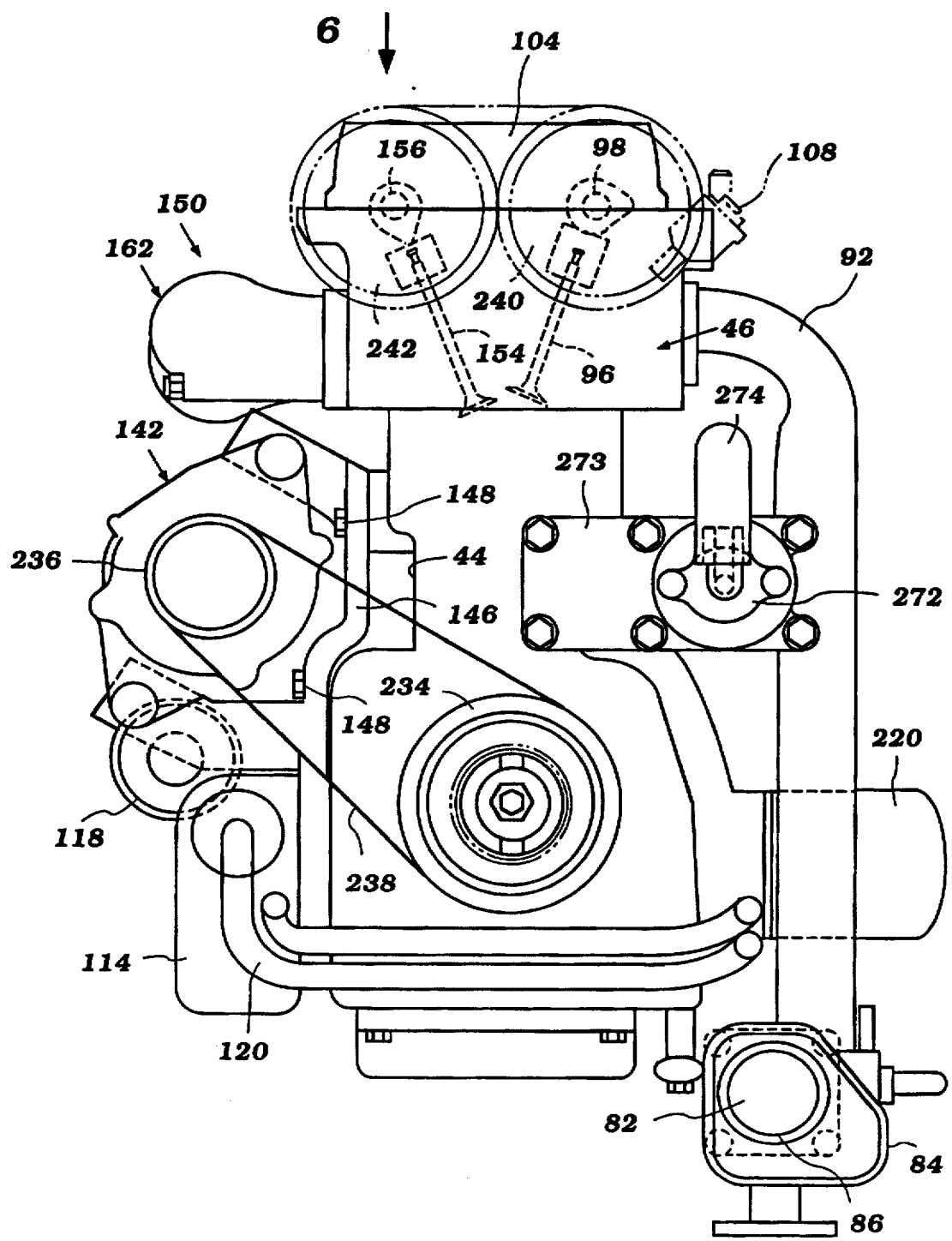
FIG. 3 is a top view of the engine illustrated in FIG. 2.
Figure 4:
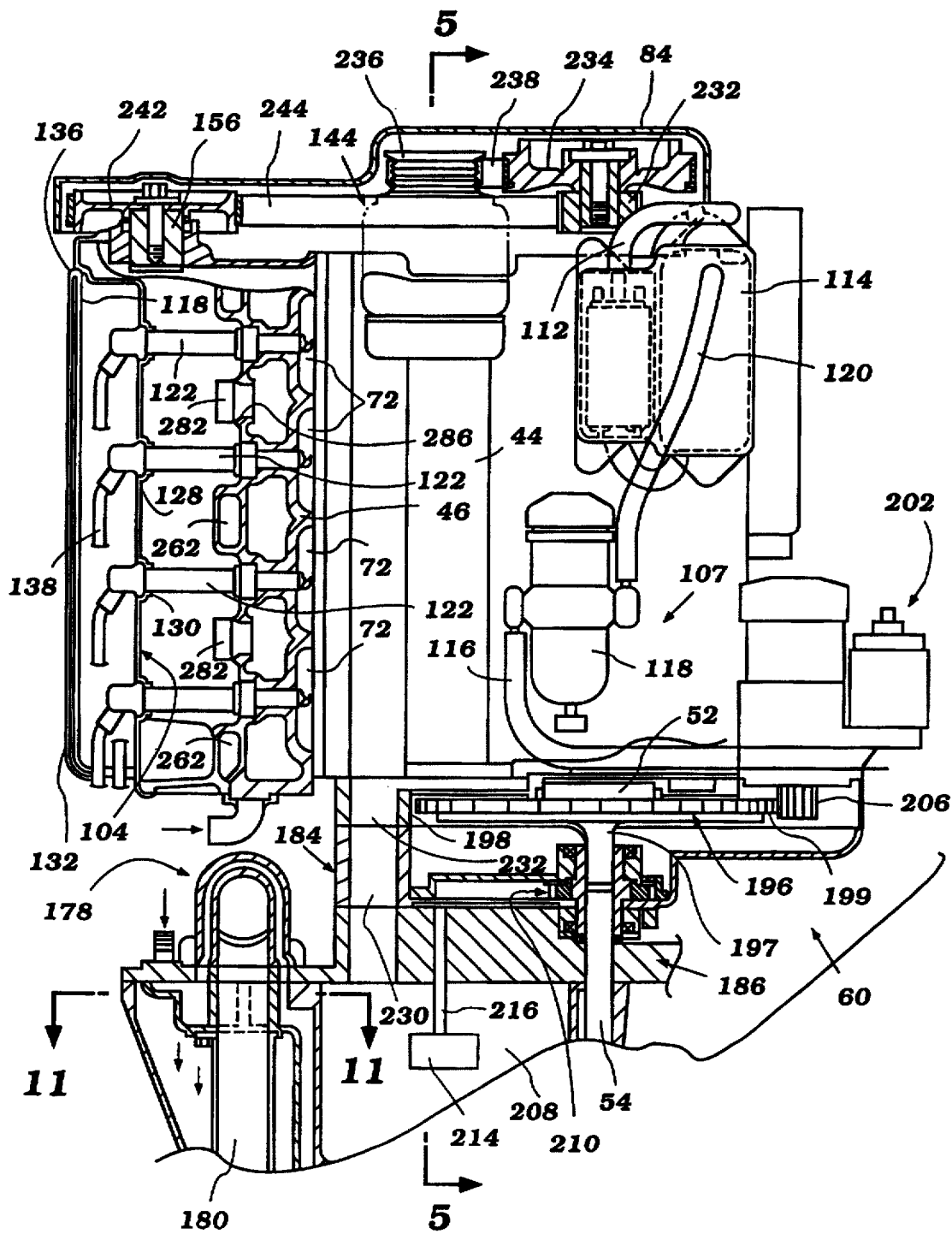
FIG. 4 is an opposite side view of the engine from that illustrated in FIG. 2, with certain portions thereof illustrated in cross-section.

Fuel is provided to each combustion chamber 72 for fueling the combustion process with a fuel system 107. Preferably, a fuel injector 108 (see FIGS. 1, 3 and 7) is positioned so that its injector nozzle extends into each intake passage 94 for providing fuel to the incoming air. As illustrated in FIG. 4, fuel is supplied to each injector 108 through a pair of fuel lines 112 from a vapor separator tank 114. Fuel is drawn from a fuel tank (not shown), through a fuel line 116 by a fuel pump 118, from where it is delivered to the separator tank 114 through a fuel line 120. Advantageously, and as best illustrated in FIG. 3, the fuel pump 118 and separator tank 114 are positioned along the side of the engine and generally opposite the cylinder head 46.

An ignition system is provided for igniting the air/fuel mixture within each combustion chamber 72. This ignition system includes a spark plug 122 having its tip positioned within the combustion chamber 72 and a head portion 124 extending outwardly of the cylinder head 46. The head portion 124 of the spark plug 122 extends into a hollow area 126 of the cam shaft cover 104. The head portion 124 of the spark plug 122 is supported, in part, by a flange 128 extending into the hollow area 126 from each side of the cover 104, the flange 128 having a curved seat portion 130 engaging the spark plug 124.

A cover plate 132 encloses the hollow area 126 within the cover 124 and is connected thereto by bolts 134. A seal 138 is provided between the plate 132 and cover 104 for preventing water and the like from entering the hollow area 126.

Ignition wires 138,140 extend from the spark plugs 122 to a pair of ignition coils 142a,b. The ignition coils 142a,b are charged with an alternator 144 (See FIG. 3), which is described in more detail below.

Figure 5:
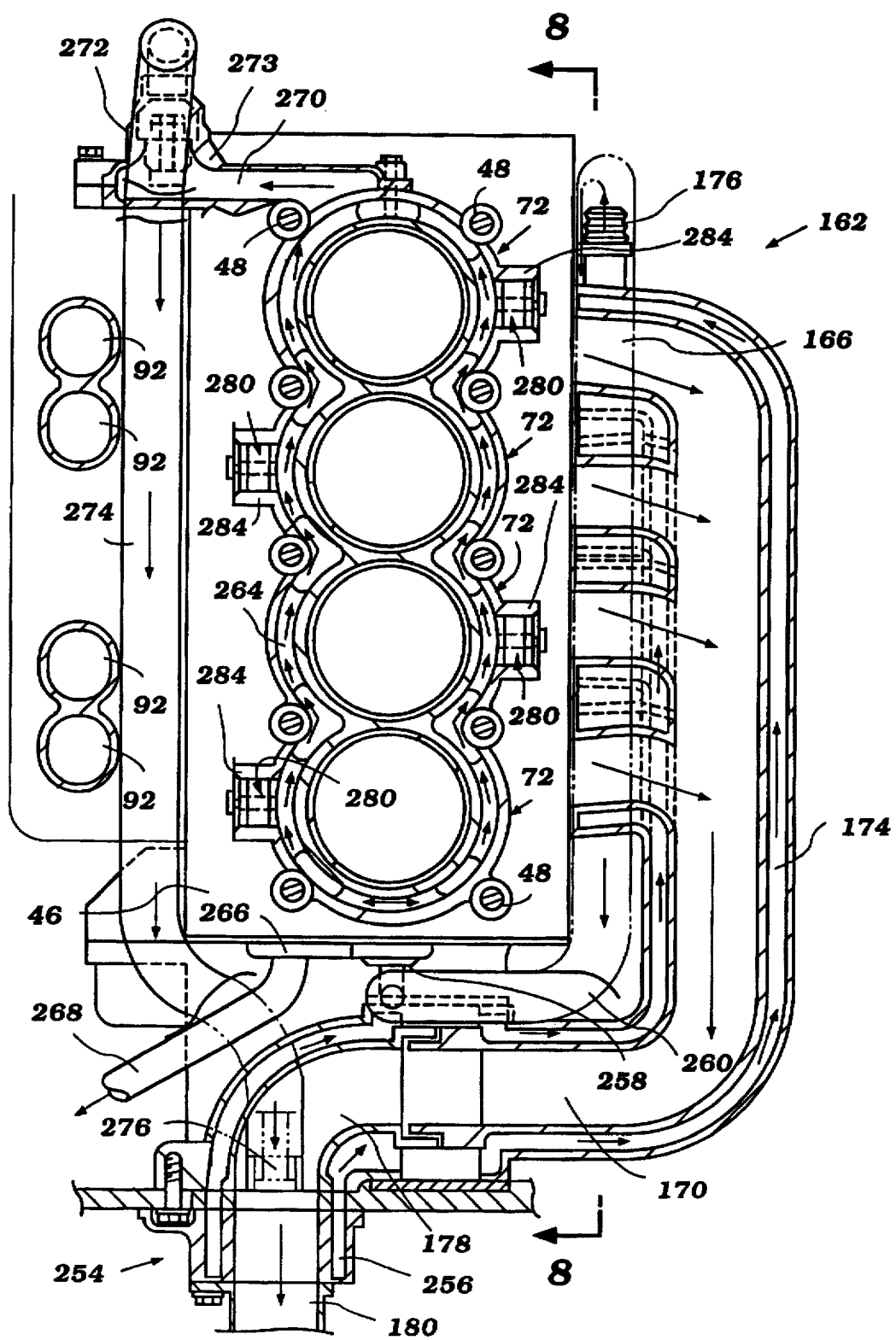
FIG. 5 is a cross-sectional side view of the engine illustrated in FIG. 4 and taken along line 5—5 therein.
Figure 6:
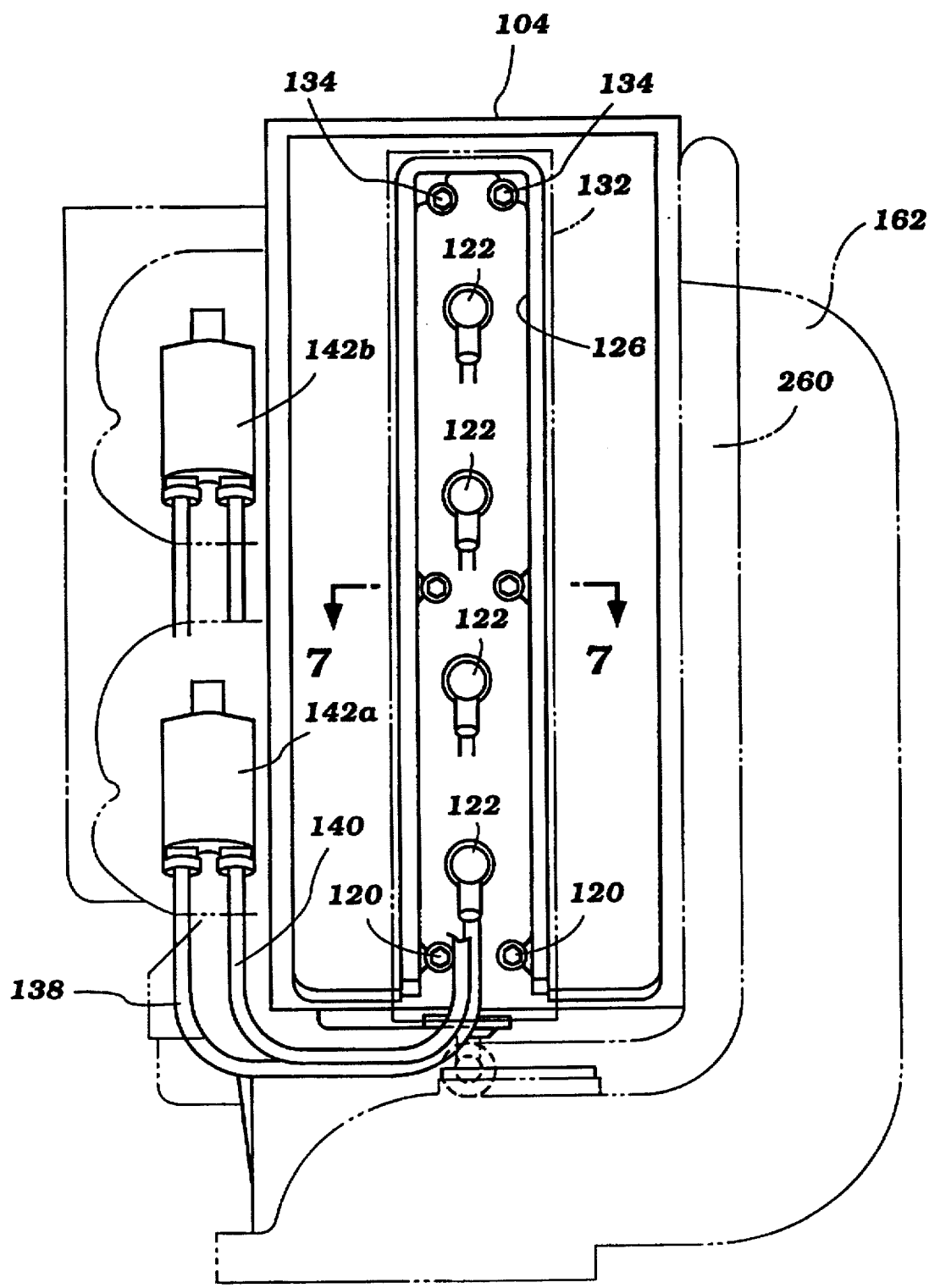
FIG. 6 is an elevational view of the engine illustrated in FIG. 3 taken in the direction of arrow 6 therein.

As best illustrated in FIG. 5, an exhaust system 150 is provided for routing exhaust from each combustion chamber 72 to a point outside of the outboard motor 20. The exhaust system 150 includes an exhaust passage 152 leading through the cylinder head 46 from each combustion chamber 152 (See FIG. 7). Flow of exhaust from the combustion chamber 72 to this passage 152 is controlled with a valve 154, the valve operated by an exhaust camshaft 156 comprising a rotatable shaft 158 having a number of actuating lobes 160 thereon. As with the intake camshaft 98, the exhaust camshaft 156 is rotatably journalled with respect to the cylinder head 46 and positioned within the camshaft cover 104.

Exhaust which passes through the exhaust passages 152 flows to an exhaust manifold 162 (See FIGS. 3, 5, 6 and 8). The exhaust manifold 162 is connected to the cylinder head 46 with several bolts 164 on the side thereof opposite that where the intake air runners 92 are connected to the cylinder head, whereby heat from the exhaust does not readily affect the intake air which is provided the engine, improving engine efficiency. The exhaust manifold 162 extends generally vertically along the engine 22, and has an inlet 166 corresponding to the exhaust passage outlet of each of the combustion chambers 72. Notably, while the inlets 166 are in general alignment (along line L in FIG. 8), the passage 168 through the manifold 162 undulates. A manifold outlet 170 is provided at the bottom of the manifold 162 generally opposite the inlets 166.

Figure 8:
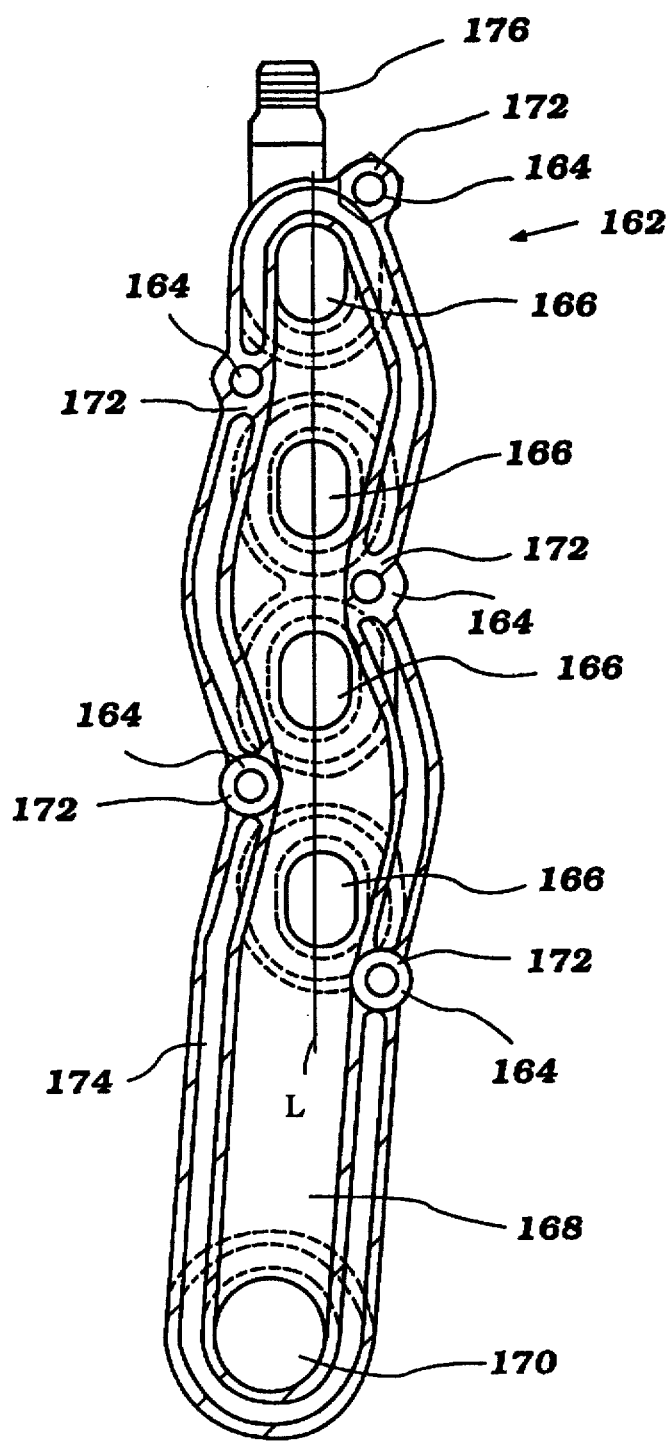
FIG. 8 is a partial cross-sectional view of the engine illustrated in FIG. 5 and taken along line 8—8 therein.

Advantageously, since exhaust manifold 162 includes a number of mountings 172 through which the bolts 164 extend. As illustrated in FIG. 8, these mountings 172 are generally in alignment along opposite sides of the manifold 162. This particular mounting arrangement ensures that, even if the manifold 162 warps or bends, the distances between the mountings 172 remains fixed in the cross-direction. This particular vertical arrangement for the exhaust manifold 162 wherein the inlets 166 are arranged within a single passage and the outlet 179 is positioned below the engine 22 allows for a compact arrangement.

As described in more detail below, but also illustrated in FIGS. 5 and 7, the coolant passages 174 are formed within the manifold 162 surrounding the exhaust passage 168 therethrough. The passages 174 are arranged so that coolant from an inlet port 176 flows upwardly from the exhaust outlet 170 to cool the length of the manifold 162, as described in more detail below.

As illustrated in FIG. 5, the exhaust outlet 170 extends to a connecting tube 178 which extends around the bottom of the engine 22 to a downwardly extending exhaust pipe 180. The exhaust pipe 180 leads to a passage 188 leading through the upper section 56 of the lower unit 32 and through a passage 190 in the lower section 58 of the lower unit 32 to exhaust passage 190 through the propeller 68 to an underwater discharge. This exhaust path is circumvented in favor of an above-water discharge port 194 in those cases where the engine 22 is running at idle or near idle conditions.

The exhaust guide 60 has an upper section 182, a middle section 184, and a lower section 186. As illustrated in FIGS. 2, 4, 9 and 10, a flywheel 196 is positioned within a recess 198 which is formed by the upper section 182 of the exhaust guide 60. The flywheel 196 is connected to the crankshaft 52 via several bolts 200 (See FIG. 2). The drive shaft 54 is connected to shaft section 197 extending from the flywheel 196 through a pump sleeve 212 of an oil pump 210, as disclosed below. In this arrangement, the crankshaft 52, flywheel 196 and drive shaft 54 all rotate with one another.

Figure 9:
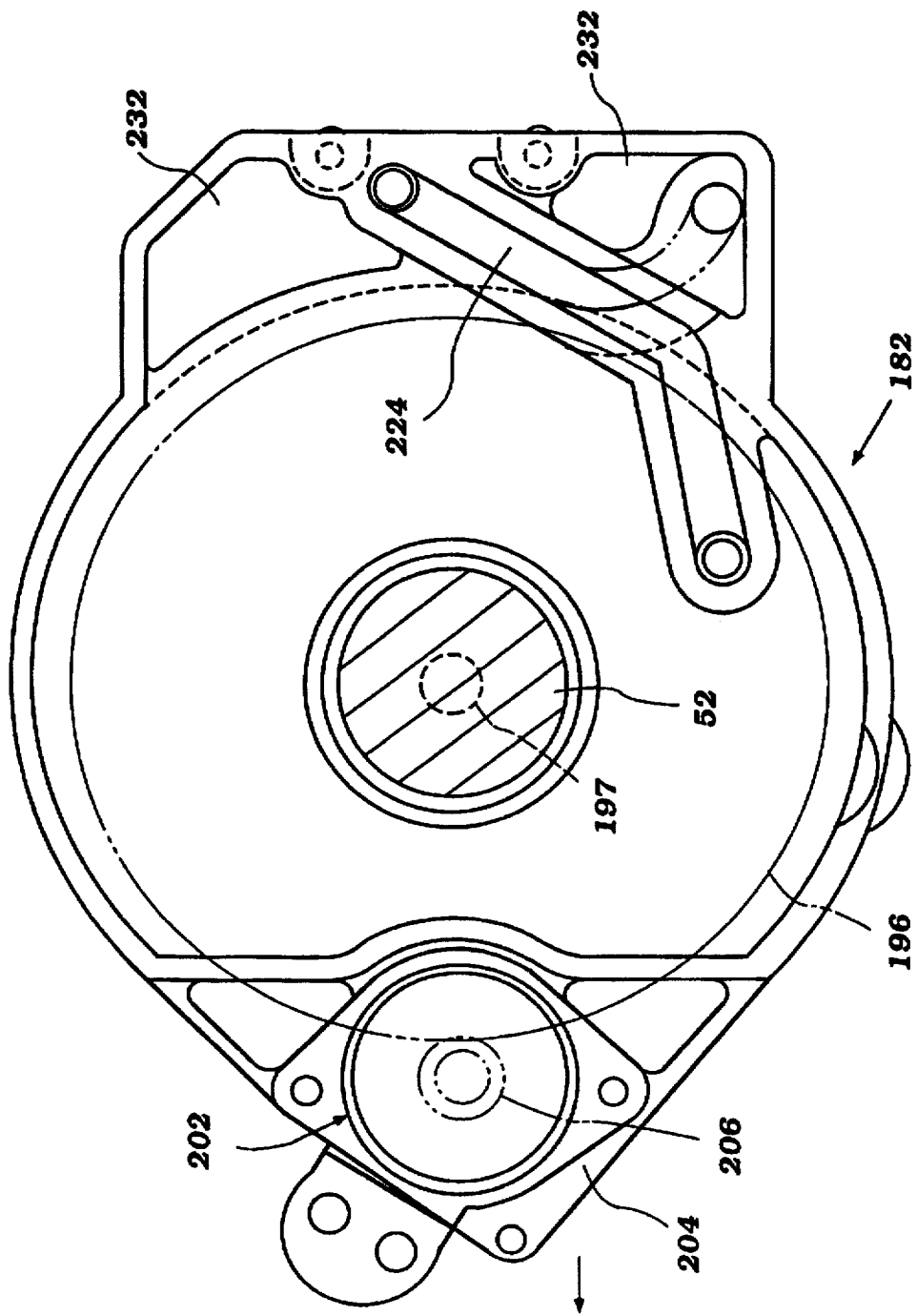
FIG. 9 is a partial cross-sectional view of the engine illustrated in FIG. 2 and taken along line 9—9 therein.

As illustrated in FIG. 4, a starter motor 202 is provided for rotating the flywheel 196 and starting the engine. The starter motor 202 is provided on the side of the engine opposite the cylinder head 46, and as illustrated in FIG. 9, is mounted thereto with a starter motor mount 204. The starter motor 202 is primarily positioned within a recessed section of the upper section 182 of the exhaust guide 60, as illustrated in FIG. 9. The starter motor 204 has an output pinion gear 206 having teeth thereon for engagement with teeth 199 of the flywheel 196.

The above-stated position of the starter motor 204 has the advantage that, being mounted low on the engine 22, it aids in maintaining a low center of gravity for the engine 22. As the center of gravity of the engine 22 remains low, the tilt or "trim" feature of the outboard motor 20 is more efficient. In addition, the starter motor 204 does not interfere with the space required for the air intake or throttle body, nor does the starter extend in front of the cylinder head 46 in a position which would interfere with access to the valves therein. Another advantage is that the starter motor 204 directly engages the flywheel 196, eliminating the need for a second gear positioned on the crankshaft 52 for engagement by the starter motor 204 in starting the engine.

The engine 22 includes a lubricating system for providing lubricant thereto. Preferably, the lubricating system includes an oil tank 208, an oil pump 210, and a number of passages. The oil tank 208 is positioned below the engine 22 within the lower unit 32 of the motor 20.

The pump 210 is driven by the rotation of the pump sleeve 212. This position of the oil pump 210 allows the starter motor 204 to be positioned as stated above, and is advantageous since it forms the connection between the flywheel and drive shaft, thus eliminating a separate connector therefor.

Figure 10:
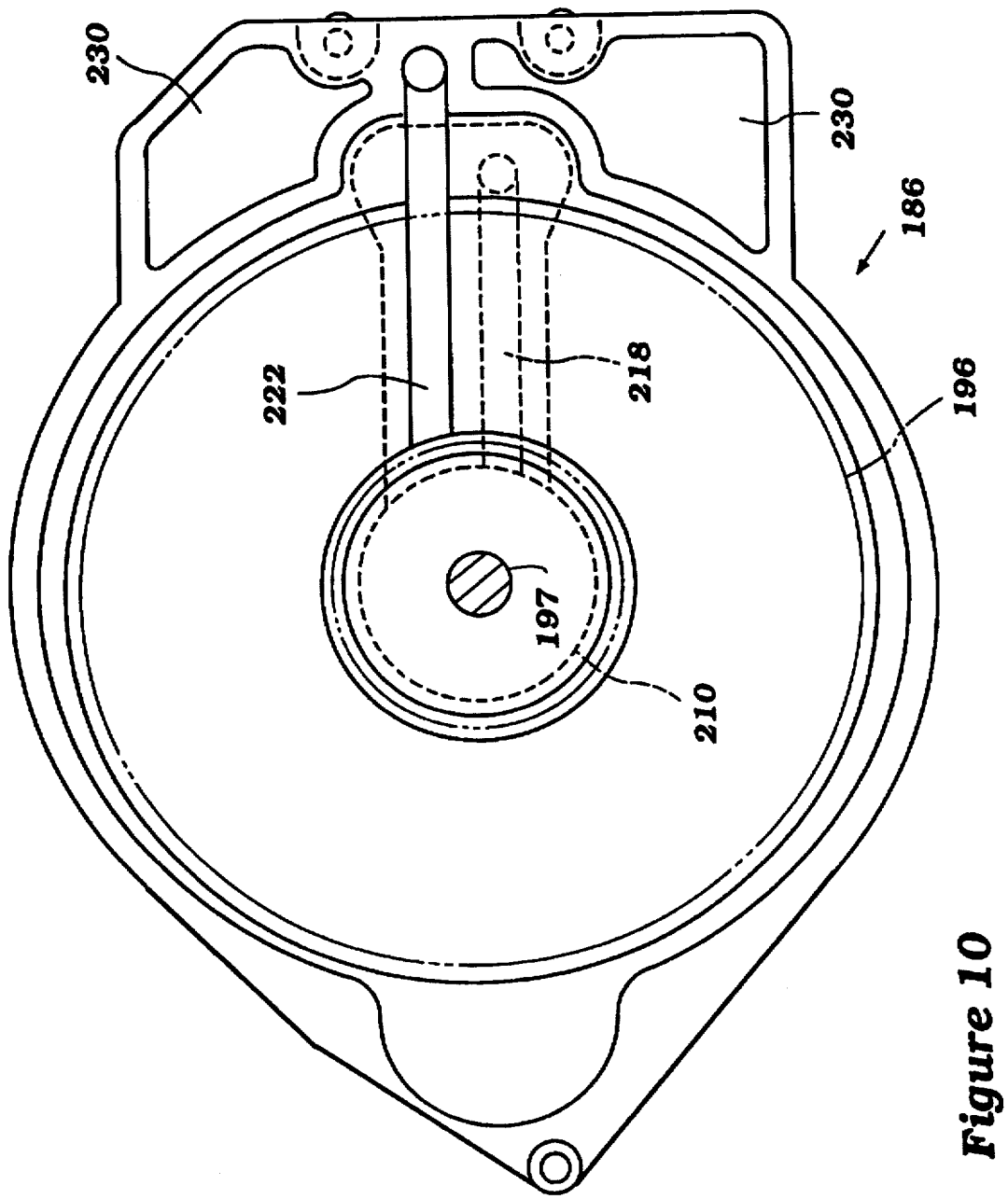
FIG. 10 is a partial cross-sectional view of the engine illustrated in FIG. 2 and taken along line 10—10 therein.

Oil from the oil tank 208 is pumped through an oil strainer 214 through an oil pipe 216 and an oil passage 218 within the middle section 184 of the exhaust guide 60 (See FIGS. 4 and 10). This pumped oil is forwarded to an oil filter 220 by the pump through an oil compression passage 224 provided in the upper section 182 of the exhaust guide (See FIG. 9) and oil compression passage 222 in the middle section 184 of the exhaust guide 60 (See FIG. 10) and an external oil line 226. The passage of the oil through the exhaust guide 60 in the above-stated manner is desirable since it permits routing of the oil in a manner which avoids the flywheel 196, and yet is compact in nature.

Notably, the oil filter 220 is conveniently positioned between the split pairs of air intake runners 92, thereby providing easy access thereto. In addition, the filter 220 is positioned on the side of the engine 22 opposite the alternator 144 and exhaust system 150, so that the heat generated therefrom does not add to the heating of the oil.

The filtered oil is pumped from the filter 220 to the engine 22 through another oil line 228, from which it is distributed throughout the interior of the engine 22. Once circulated, the oil returns to the oil tank 208 through a return passage 232 in the upper section 182 section of the exhaust guide 60 aligned with a return 230 in the middle section 184 of the exhaust guide 60 (See FIGS. 2 and 4).

Means are provided for driving the alternator 144 and the camshafts 98,156. Preferably, as illustrated in FIG. 3, the alternator 144 is mounted to the cylinder block 44 with a bracket 146 and bolts 148. Advantageously, the alternator 144 is positioned on the side of the engine 22 opposite the air intake system, whereby the alternator 144 does not cause a heating of the incoming air and does not affect the routing of the runners 92.

As illustrated in FIGS. 1, 2 and 4, a sprocket 232 and pulley 234 are mounted on an end of the crankshaft 52 extending beyond the cylinder block 44 opposite the flywheel 196. The pulley 234 is in driving relation to a pulley 236 of the alternator 144 by a drive belt 238.

The sprocket 232 is connected to camshaft sprockets 240,242 which are positioned on the ends of the intake and exhaust camshafts 98,156, respectively. A belt 244 extends in driving relation between the sprocket 232 and the camshaft sprockets 240,242.

Figure 11:
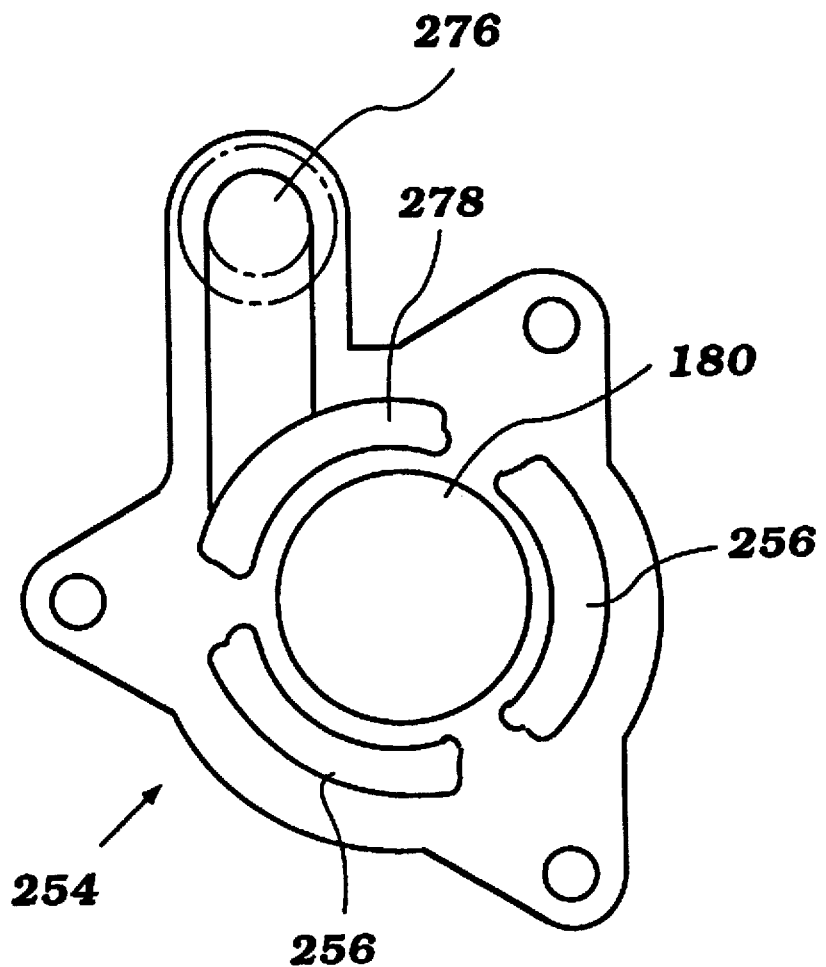
FIG. 11 is a partial cross-sectional view of the engine illustrated in FIG. 4 and taken along line 11—11 therein.

The engine 22 includes a coolant system. The coolant system includes a coolant pump 250 (See FIG. 1) which is driven by the drive shaft 54. The coolant pump 250 pumps coolant (in this case, water from the body of water in which the outboard motor is positioned) from an inlet through the lower unit 32 upwardly through a coolant passage 252 to an exhaust pipe connector 254. From there, the coolant is directed to the exhaust system 150. As illustrated in FIG. 11, the coolant flows through a passage 256 provided through the connector 256 around the exhaust pipe 180.

As best illustrated in FIG. 5, the coolant passage 256 is connected to the coolant passage 174 of the exhaust manifold 162. A coolant inlet port 258 is provided at the bottom of the cylinder head 46. The coolant inlet ports 176,258 are connected by a coolant pipe 260 which is external to the cylinder block 44. The coolant is guided from the top of the exhaust manifold 162 to the bottom of the cylinder head 46. The coolant which is guided to the cylinder head 46 flows inside of coolant passages 262,264 (See FIGS. 4 and 5) for cooling the cylinder head 46 and cylinder block 44.

At the bottom of the cylinder head 46, a pressure regulator 266 is provided for opening and closing a drain pipe 268. The regulator 266 opens to allow coolant to drain through the drain pipe 268 when the coolant pressure within the cylinder head 46 and block 44 exceeds a predetermined high pressure.

A coolant passage 270 is provided for returning the coolant to the exhaust system 150. This passage 270 is formed in the upper portion of the cylinder block 44. The coolant is drained to the exhaust system 150 through a thermostat 272 (which is positioned on a bracket 273, as best illustrated in FIG. 3) and coolant pipe 274. The coolant pipe 274 extends to a coolant drain 276 formed in the lower section 186 of the exhaust guide 60. This drain 276 is drained to a passage 278 formed in the connector 254 (See FIG. 11).

Figure 12:
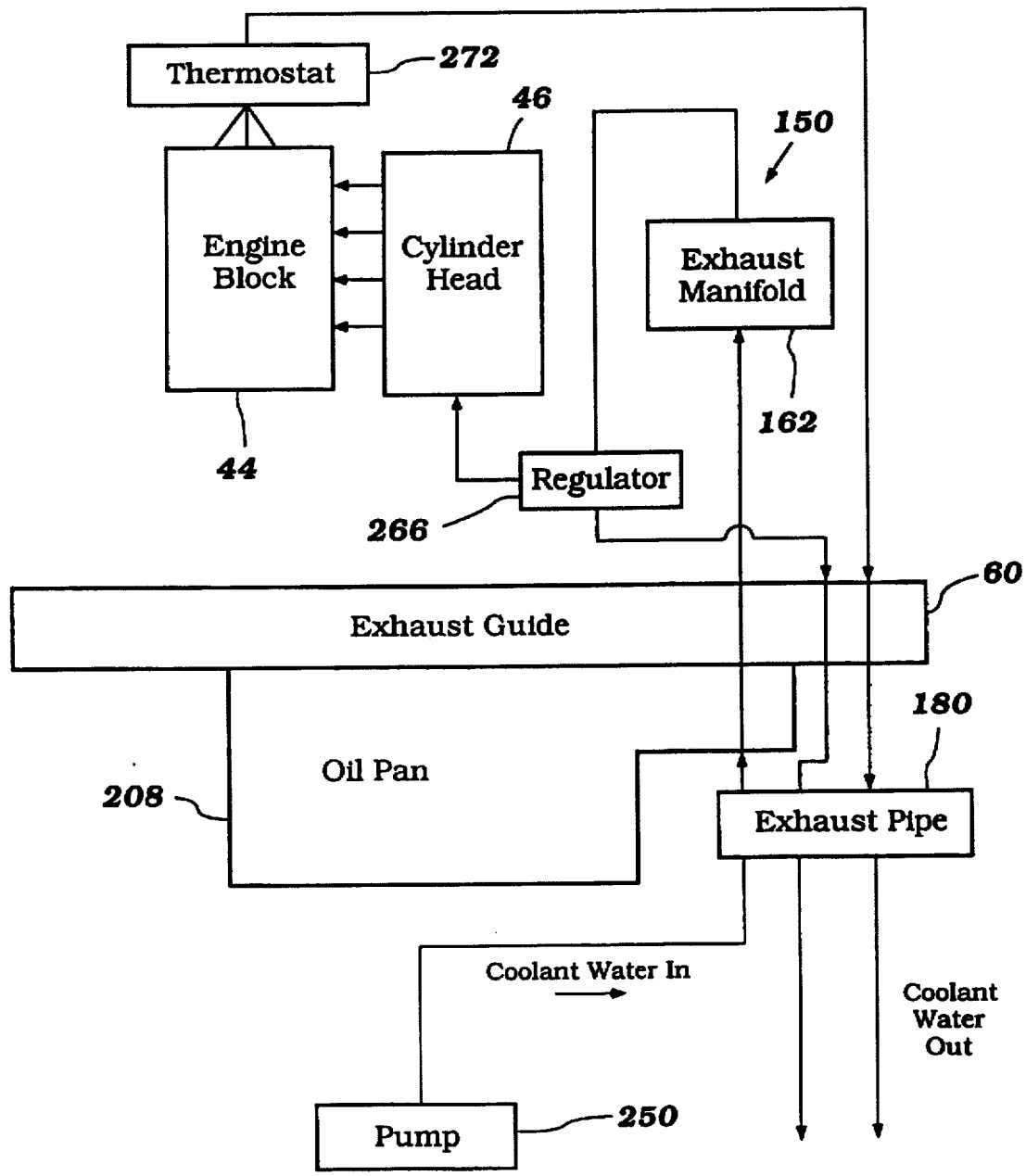
FIG. 12 diagrammatically illustrates the flow of coolant through the engine illustrated in FIG. 1.

As illustrated in FIG. 12 in schematic form, the coolant is pumped by the pump 250 to the exhaust system 150 along the exhaust pipe 180 and exhaust guide 60. First, the coolant cools the exhaust manifold 162. Then, it is muted to cool the cylinder head 46 and cylinder block 44, with the maximum pressure of the coolant therein regulated by the pressure regulator 266. The coolant is returned to the exhaust guide 60 through the thermostat 272 and is used to then cool the exhaust pipe 180 before being discharged from the motor 20.

The arrangement of the cooling system has a number of significant advantages. First, the coolant is supplied to the area with the highest temperatures first, thereby prolonging the life of those parts and improving engine performance. In addition, the flow path of the coolant from the exhaust system 150 to the bottom part of the cylinder head 46, and then from the upper part of the cylinder block 44 to the exhaust pipe 180 has the advantage of providing a smooth coolant flow path. In addition, since the thermostat 272 is positioned along the coolant path after the coolant has passed through the cylinder head 46 and cylinder block 44, the coolant temperature is not subject to larger temperature swings, whereby operation of the thermostat in opening and closing the coolant path is efficient and effective.

The position of the thermostat 72 is also advantageous (at the top of the engine), since it is positioned outside of that area traversed by the belt 244 which drives the camshafts 98,156, and is thus easily removable without interference. At the same time, the thermostat 272 is positioned near the belt 244 occupying an otherwise empty space adjacent thereto and minimizing the size of the engine 22.

As best illustrated in FIGS. 4 and 5, anti-corrosion electrodes 280 or "anodes" of a type known to those skilled in the art are provided in the cylinder block 44 adjacent the bores defining the combustion chambers 72, facing the coolant passages 264 thereabout. The electrodes 280 are preferably staggered on opposite sides of the combustion chambers 72, and effectively reduce the corrosive effects of the flow of the coolant through the cylinder block 44.

In addition, similar electrodes 282 are provided in the cylinder head 46 facing the coolant passages 262 so as to prevent corrosion of the cylinder head 46 by the coolant.

These electrodes 280,282 are preferably mounted within sand drain holes 284,286 which are provided during the casting process of the cylinder block 44 and cylinder head 46, thereby providing for a low manufacturing cost. Further, the electrodes 280,282 are easily installed during assembly of the engine in this fashion.

Of course, the foregoing description is that of preferred embodiments of the invention, and various changes and modifications may be made without departing from the spirit and scope of the invention, as defined by the appended claims.

What is claimed is:

1. In combination, an engine cowling and an internal combustion engine positioned therein, said cowling having at least one air vent therethrough, said engine having a block with at least one variable volume combustion chamber, an intake passage leading to said chamber and an exhaust passage leading therefrom, a member movably positioned within each combustion chamber driving a crankshaft which is rotatably journalled with respect to said block, at least one camshaft actuating means for opening and closing said intake and exhaust passages, means for driving said camshaft positioned on an end of said engine adjacent said cowling, a cover extending around and generally enclosing said means for driving and defining between said cover and said cowling an air flow passage from said vent, said cover having an air inlet portion comprising a passage extending through said cover to an air passage which extends to intake passage.

2. The combination in accordance with claim 1, wherein said cowling comprises an outboard motor cowling.

3. The combination in accordance with claim 1, wherein said camshaft and crankshaft extend beyond said end of said engine, and said means for driving comprises a belt engaging a pulley attached to said camshaft and a pulley attached to said crankshaft.

4. The combination in accordance with claim 1, wherein said engine further includes an ignition system for initiating combustion in said combustion chamber, said ignition system including an alternator for providing an electric current, said alternator positioned on a side of said engine opposite said engine air intake.

5. The combination in accordance with claim 1, wherein said passage through said cover leads to a throttle body, said throttle body and cover separated by a flexible member, said member defining an air passage therethrough for delivering air passing into said opening in said cover to said throttle body.

6. The combination in accordance with claim 5, further including a surge tank and a runner extending from said surge tank to each of said intake passages, said throttle body having a passage therethrough leading to said surge tank.

7. The combination in accordance with claim 1, wherein said engine is oriented such that said crankshaft extends vertically and said cover is positioned at a top side of said engine.

8. The combination in accordance with claim 5, wherein said flexible member comprises a rubber hose.

9. An outboard motor having a cowling with an air vent therein and powered by an internal combustion engine positioned within said cowling, said engine comprising a cylinder block, a cylinder head connected to said block and cooperating therewith to define at least one combustion chamber, a member movably mounted on said combustion chamber and connected to a vertically oriented crankshaft, said crankshaft journalled for rotation with respect to said block and having first end extending beyond a top end of said engine, an air intake passage leading through said cylinder head to said combustion chamber and an exhaust passage leading from said combustion chamber through said cylinder head, valve means for opening and closing said intake and exhaust passages, said valve means operated by at least one camshaft journalled for rotation with respect to said cylinder head and arranged vertically, said camshaft having an end extending beyond said top end of said engine, a drive belt extending in driving relation between said first end of said crankshaft and said end of said camshaft, whereby said crankshaft drives said camshaft, a cover extending over said drive belt and crankshaft and camshaft at said top end of said engine, said cover and cowling of said motor defining therebetween an air passage, a runner extending to each air intake passage, each runner having an inlet, said cover having an air passage defined therethrough from said air passage between said cover and said cowling for directing air therefrom to said runner.

10. The outboard motor in accordance with claim 9, further including a throttle body having passage therethrough and a throttle plate therein for regulating the passage of air through said passage, said throttle body having an inlet and an outlet, said outlet leading to said runners and said inlet in communication with said air passage through said cover.

11. The outboard motor in accordance with claim 10, wherein a flexible tube defines an air path from said air passage through said cover to said inlet of said throttle body.

12. The outboard motor in accordance with claim 11, wherein said flexible tube comprises a rubber hose.

13. The outboard motor in accordance with claim 11, wherein said outlet of said throttle body extends to a surge tank, and wherein said runners extend from said surge tank.

14. The outboard motor in accordance with claim 10, wherein said cover comprises a wall, said wall having an outer surface and an inner surface, said outer surface facing said cowling, and wherein said air passage is defined by an opening in said wall.

15. The outboard motor in accordance with claim 14, wherein said outer surface has an opening therein defined by a segment of said wall extending towards said engine.

* * * * *